(12) United States Patent
Rodgers, II

(10) Patent No.: US 7,470,206 B2
(45) Date of Patent: Dec. 30, 2008

(54) MULTI-SPEED COUNTERSHAFT TRANSMISSION WITH A PLANETARY GEAR SET

(75) Inventor: Dane L. Rodgers, II, Avon, IN (US)

(73) Assignee: General Motors Corporation, Detroit, MI (US)

( * ) Notice: Subject to any disclaimer, the term of this patent is extended or adjusted under 35 U.S.C. 154(b) by 350 days.

(21) Appl. No.: 11/459,400

(22) Filed: Jul. 24, 2006

(65) Prior Publication Data

US 2008/0045373 A1 Feb. 21, 2008

(51) Int. Cl.
*F16H 37/02* (2006.01)
(52) U.S. Cl. ............... 475/218; 475/207; 475/219; 74/329; 74/331
(58) Field of Classification Search ........ 475/207, 475/218, 219; 74/325, 329, 331, 339
See application file for complete search history.

(56) References Cited

U.S. PATENT DOCUMENTS

| | | | | | |
|---|---|---|---|---|---|
| 3,654,822 | A | * | 4/1972 | Singer et al. | 475/218 |
| RE33,126 | E | * | 12/1989 | Wittke | 475/218 |
| 5,823,051 | A | * | 10/1998 | Hall, III | 74/325 |
| 6,387,006 | B1 | | 5/2002 | Jung | 475/207 |
| 6,440,032 | B1 | * | 8/2002 | Stauber et al. | 475/207 |
| 6,869,379 | B2 | | 3/2005 | Voss et al. | 475/218 |
| 7,297,085 | B2 | * | 11/2007 | Klemen | 475/280 |

* cited by examiner

*Primary Examiner*—David D. Le

(57) ABSTRACT

A transmission is provided that combines first and second countershafts with a planetary gear set, and uses first and second head gear sets to provide ratio. Each of the countershafts supports gears in no more than five co-planar, intermeshing gear sets (and in most embodiments no more than four co-planar, intermeshing gear sets), thus minimizing the overall length of the countershafts. The transmission provides at least nine forward speed ratios and a reverse speed ratio and utilizes only eight torque-transmitting mechanisms.

19 Claims, 9 Drawing Sheets

| GEAR | TORQUE RATIO | RATIO STEP | C1 | C2 | C3 | C4 | C5 | C6 | C7 | DF | DR |
|------|--------------|------------|----|----|----|----|----|----|----|----|----|
| REV 4 | -1.1661 | | | | | | X | | X | X | X |
| REV 3 | -2.1732 | | | X | | | | | X | | X |
| REV 2 | -3.9982 | | | X | | | | | | | X |
| REV 1 | -7.4508 | | X | | | | | | | | X |
| 1 | 7.3487 | | X | | | | | | | O | O |
| 2 | 5.4230 | 1.3551 | | X | | | | | | X | |
| 3 | 3.9435 | 1.3752 | | | X | | | X | | X | |
| 4 | 2.9101 | 1.3551 | | X | | | | X | | X | |
| 5 | 2.1434 | 1.3577 | X | | | | | X | | X | |
| 6 | 1.5817 | 1.3551 | | X | | | X | | | X | |
| 7 | 1.1502 | 1.3752 | | | X | | | | X | X | |
| 8 | 1.0000 | 1.1502 | | | | X | | | X | X | |
| 9 | 0.8488 | 1.1782 | | | | | X | | X | X | |
| TRC | 8.658 | | | | | | | | | | |

X = ENGAGED; O = SHIFTED EITHER DIRECTION

FIG. 2

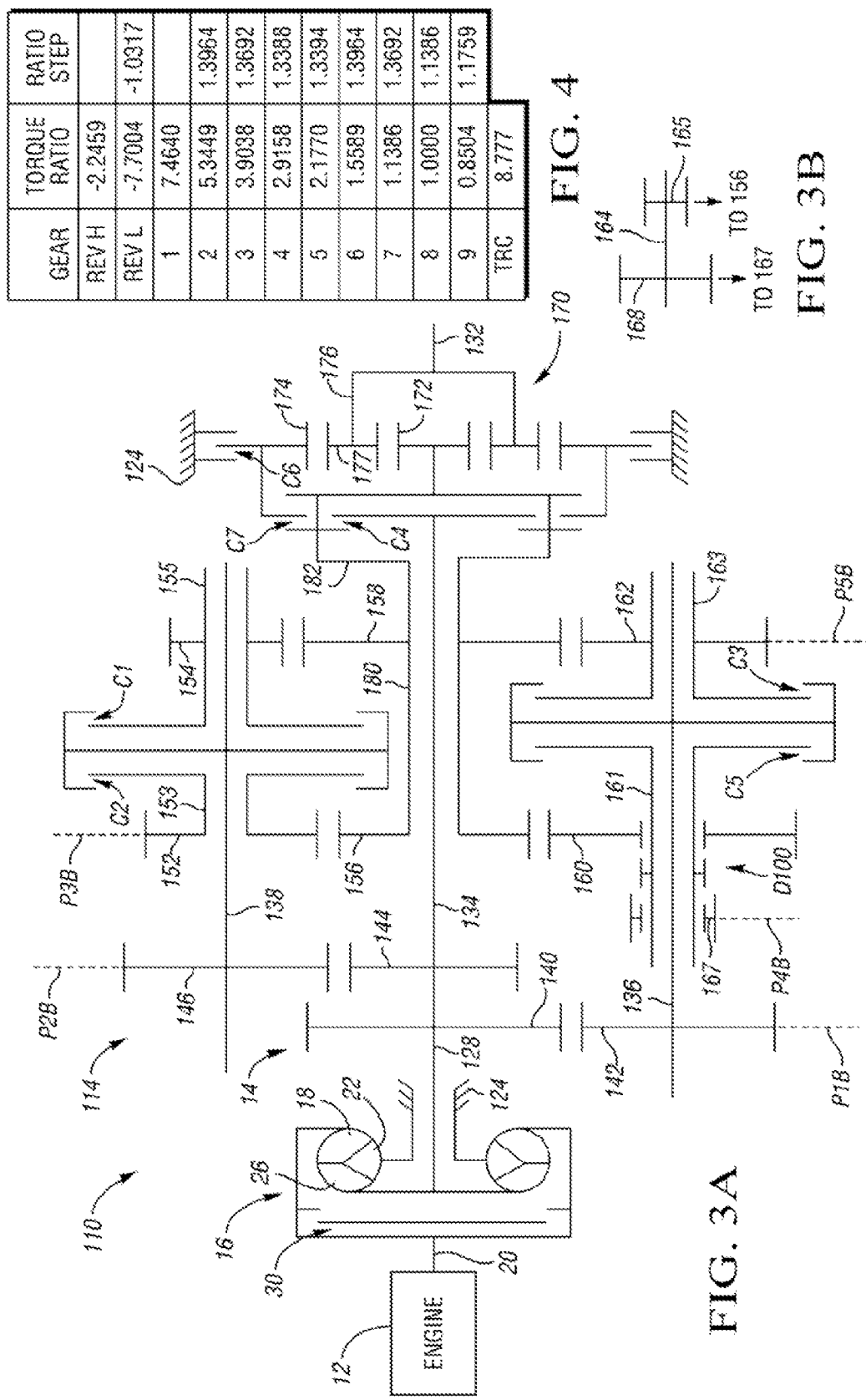

| GEAR | TORQUE RATIO | RATIO STEP | C1 | C2 | C3 | C4 | C5 | C6 | C7 | CR |
|---|---|---|---|---|---|---|---|---|---|---|
| REV H | -2.5475 | | | | | | | | X | X |
| REV L | -8.7342 | -1.1702 | | | | | | | | X |
| 1 | 7.4640 | | X | | | | | | | |
| 2 | 5.3449 | 1.3964 | | X | | | | X | | |
| 3 | 3.9038 | 1.3692 | | | X | | | X | | |
| 4 | 2.9158 | 1.3388 | | | | | | X | | |
| 5 | 2.1770 | 1.3394 | X | | | | X | | | |
| 6 | 1.5589 | 1.3964 | | X | | | | | X | |
| 7 | 1.1386 | 1.3692 | | | X | | | | X | |
| 8 | 1.0000 | 1.1386 | | | | X | | | X | |
| 9 | 0.8504 | 1.1759 | | | | | X | | X | |
| TRC | 8.777 | | | | | | | | | |

X = ENGAGED

FIG. 6

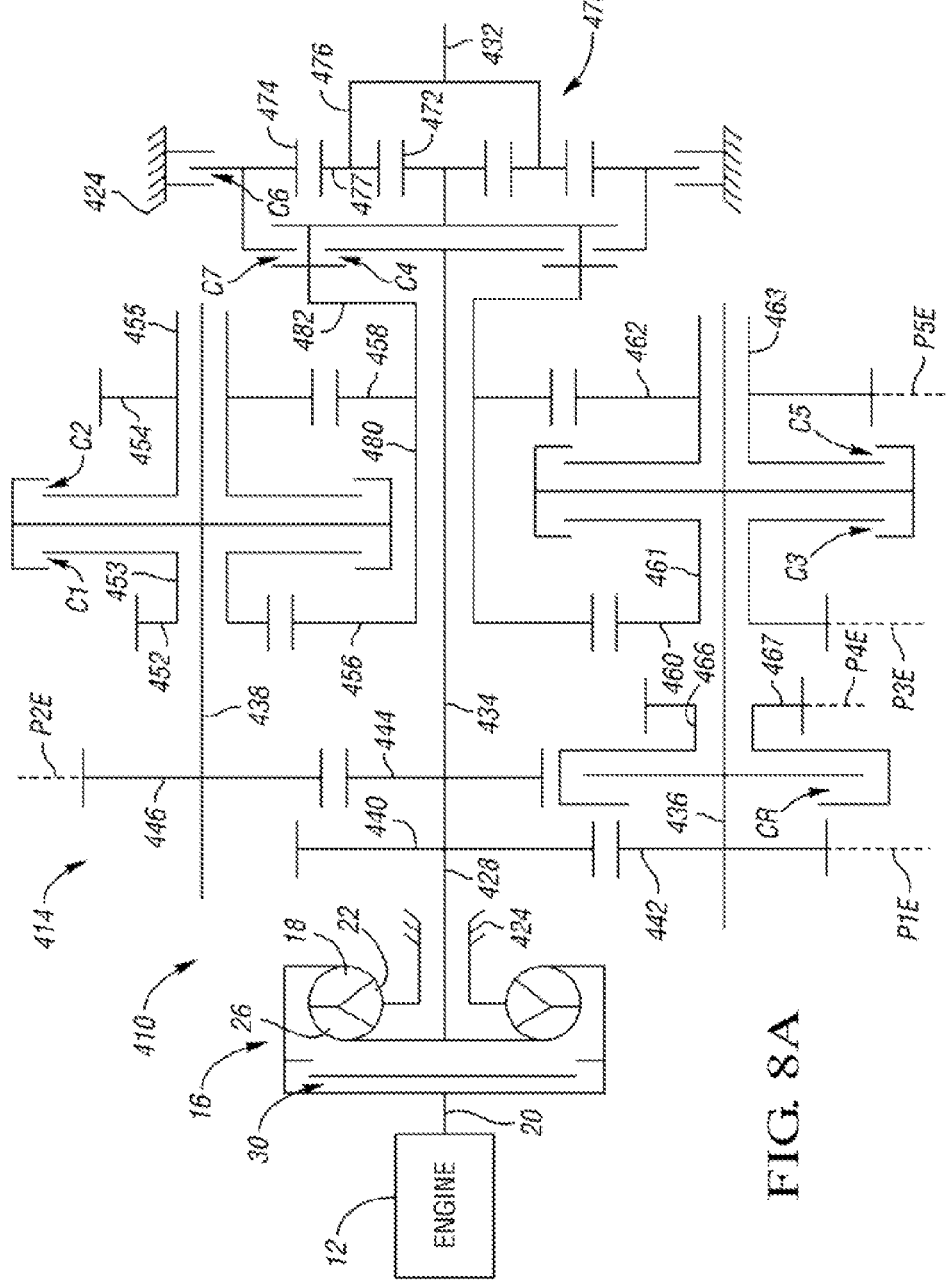

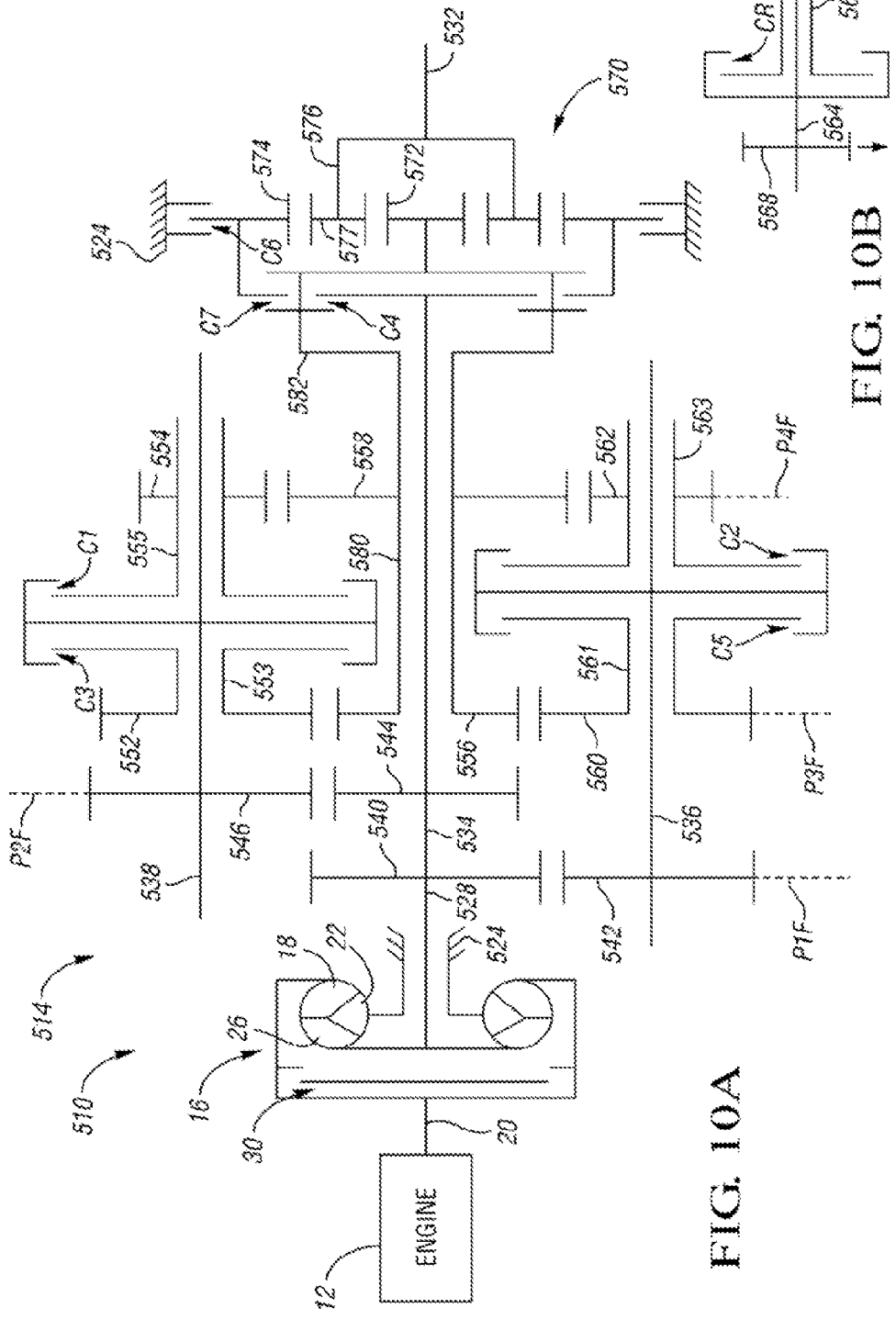
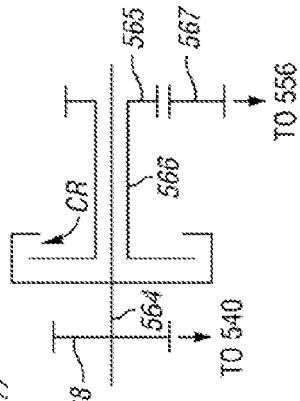
FIG. 10A
FIG. 10B

MULTI-SPEED COUNTERSHAFT TRANSMISSION WITH A PLANETARY GEAR SET

TECHNICAL FIELD

The invention relates to a multi-speed transmission having first and second countershafts and a planetary gear set.

BACKGROUND OF THE INVENTION

Automotive vehicles include a power train that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

A variety of different types of transmissions are used to deliver multiple speed ratios including manual, automated manual, dual clutch and planetary transmissions. For example, a typical multi-speed, dual clutch transmission uses a combination of two friction clutches and several dog clutch/ synchronizers to achieve "power-on" or dynamic shifts by alternating between one friction clutch and the other, with the synchronizers being "pre-selected" for the oncoming ratio prior to actually making the dynamic shift. This concept typically uses countershaft gears with a different dedicated gear pair to achieve each forward speed ratio (with the exception of being able to achieve a direct drive ratio in a rear wheel drive application). The transmission utilized for a specific application may depend on many factors, such as a minimization of required components, packaging limitations, ratio coverage and torque requirements for launch.

SUMMARY OF THE INVENTION

A combination countershaft and planetary gear set transmission is provided that achieves nine forward speed ratios and preferably at least one reverse speed ratio. The transmission includes a main shaft operatively connected to an input member as well as first and second countershafts that are each spaced from and substantially parallel with the main shaft. The transmission includes a plurality of gears forming different co-planar, intermeshing gear sets, each of the gears being concentric about the main shaft, the first countershaft or the second countershaft. The gears that are concentric with the first countershaft are aligned in not more than five (and in most embodiments not more than four), co-planar, intermeshing gear sets and the gears that are concentric with the second countershaft are aligned in not more than four co-planar, intermeshing gear sets. Preferably, the transmission includes not more that five total co-planar, intermeshing gear sets. The transmission needs only eight torque-transmitting mechanisms to achieve the nine forward and at least one reverse speed ratios.

In one aspect of the invention, the transmission is characterized by an absence of dual input or dual output torque-transmitting mechanisms, instead utilizing first and second head gear sets that provide a ratio to transfer torque to the first and second countershafts, respectively. The first head gear set at least partially forms a first co-planar, intermeshing gear set and the second head gear set at least partially forms a second co-planar, intermeshing gear set. As used herein, a "head gear set" is a set of intermeshing gears that transfers torque from the input member to a countershaft in the transmission. By utilizing the first and second head gear sets as well as the planetary gear set, the number of gears required on the countershafts is decreased, thus minimizing the overall length of the countershafts.

A reverse speed ratio may be provided in a number of ways. For example, one of the eight torque-transmitting mechanisms may be a reverse torque-transmitting mechanism that is a two-way dog clutch concentric with and supported by the first countershaft. The two-way dog clutch is shiftable in one direction to establish a reverse speed ratio and shiftable in an opposite direction to establish a forward speed ratio. Preferably, the two-way dog clutch is packaged between the first head gear set and a third co-planar, intermeshing gear set, and is generally aligned with the second co-planar, intermeshing gear set. As the axial space on the first countershaft which the dog-clutch is packaged would otherwise be unused, no additional length is required for packaging the two-way dog clutch.

Alternatively, a reverse shaft may be provided to transfer torque from either the first or the second co-planar, intermeshing gear set to the third co-planar, intermeshing gear set. The reverse shaft may include a rotating clutch to establish the torque transfer. In another alternative embodiment, the rotating clutch may be supported by the first countershaft to transfer torque via the reverse shaft.

In still another alternative embodiment, the reverse torque-transmitting mechanism may be a rotating clutch supported by the first countershaft that is selectively engagable to transfer torque directly from a first gear concentric with and supported about the first countershaft to a second gear concentric with and supported for rotation about the second countershaft, wherein the first and second gears continuously intermesh with one another. The first and second countershafts are not located in the same plane as the main shaft, enabling the first and second gears to intermesh without interference from the main shaft. These intermeshing countershaft-to-countershaft first and second gears may also be employed with the two-way dog clutch arrangement described above.

Preferably, only two rotating clutches are needed on each of the first and second countershafts in order to establish the forward speed ratios. In some embodiments, an additional rotating clutch is needed on one of the countershafts to establish the reverse speed ratio or ratios.

In another aspect of the invention, one of the torque-transmitting mechanisms is a direct drive torque-transmitting mechanism that is selectively engageable to transfer torque directly from the input member to the planetary gear set, thereby bypassing the countershafts.

In yet another aspect of the invention, one of the torque-transmitting mechanisms is a lock-up clutch selectively engageable to connect any two members of the planetary gear set for common rotation, thereby causing the entire planetary gear set to rotate at the same speed (i.e., locking-up the planetary gear set).

In yet another aspect of the invention, one of the torque-transmitting mechanisms is a brake selectively engagable to ground a ring gear member of the planetary gear set to the stationary member such as a transmission housing. The brake may also be referred to as a grounded clutch or stationary clutch.

In addition to its compact design, the transmission has many additional benefits. The transmission has adequate ratio coverage to meet both takeoff and low engine speed highway cruising requirements of a linehaul vehicle, although its use is not limited to linehaul vehicles. The highest three gear ratios are very close, allowing more precise modulation of engine speed at higher vehicle speeds when fuel economy is most critical. The combination of a countershaft and a planetary gear set configuration allows a potential increase in fuel efficiency over a traditional planetary transmission. The wide ratio coverage and relatively small ratio steps will enable lock-up of an associated torque converter in first gear as well as shifting during torque-converter lock-up. The ability to operate with the torque converter locked significantly reduces transmission cooling demands.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a truth table listing the engaged torque-transmitting mechanisms and torque ratios for each of the speed ratios of the transmission of FIG. 1, and listing ratio steps between forward torque ratios;

FIGS. 3A and 3B are schematic representations of a second embodiment of a transmission in accordance with the invention, which operates according to the engagement schedule of FIG. 2, but with only two reverse speed ratios and with the torque ratios and ratio steps indicated in FIG. 4;

FIG. 4 is a chart listing the torque ratios and step ratios for each of the speed ratios of the transmission of FIGS. 3A and 3B;

FIG. 6 is a truth table listing the engaged torque-transmitting mechanisms and torque ratios for each of the speed ratios of the transmission of FIG. 5, and listing ratio steps between forward torque ratios;

FIGS. 8A and 8B are schematic representations of a fifth embodiment of a transmission in accordance with the invention;

FIG. 9 is a chart listing the torque ratios and ratio steps for each of the speed ratios of the transmission of FIG. 8, which operates accordingly to the engagement schedule of FIG. 6;

FIGS. 10A and 10B are schematic representations of a sixth embodiment of a transmission in accordance with me invention operated according to the engagement schedule of the truth table of FIG. 6, but with different torque ratios and ratio steps as determined by the gear tooth counts.

DESCRIPTION OF THE PREFERRED EMBODIMENTS

Figure 1:
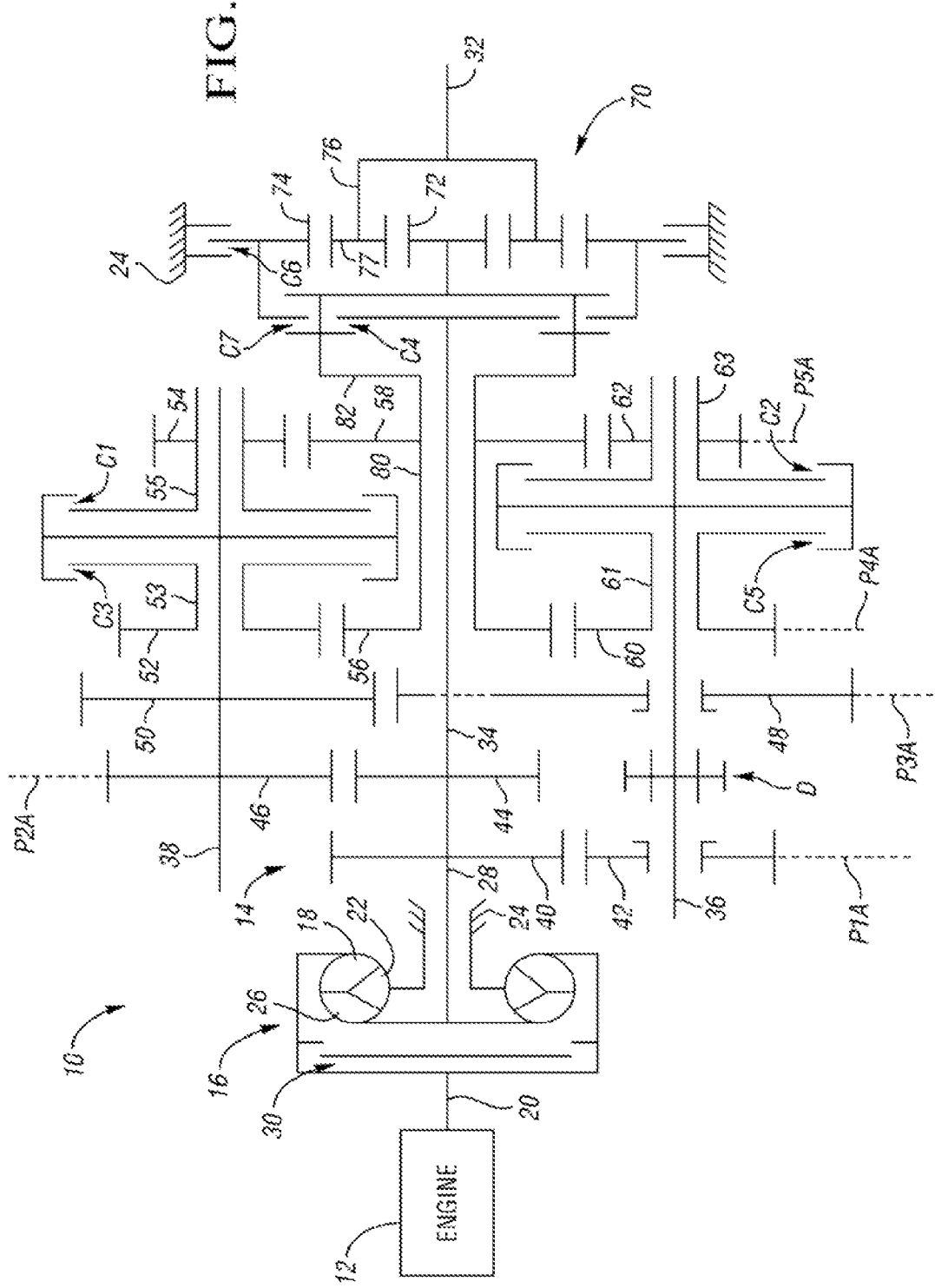
FIG. 1 is a schematic representation of a first embodiment of a transmission in accordance with the invention.

Referring to the drawings wherein like reference numbers refer to like components, FIG. 1 illustrates a powertrain 10 that includes an engine 12 operatively connected to a transmission 14 through a torque converter 16. The torque converter 16 includes a pump portion 18 connected for rotation with an engine shaft 20, a stator portion 22 grounded to a stationary member such as the transmission housing or casing 24, and a turbine portion 26. As is understood by those skilled in the art, the torque converter 16 is a fluid coupling providing torque multiplication between the pump portion 18 and the turbine portion 26. The turbine portion 26 is connected for rotation with an input member 28 of the transmission 14. The torque converter 16 includes a lock-up clutch 30. When the lock-up clutch 30 is engaged, power flow from the engine shaft 20 is directly connected with the input member 28, bypassing the fluid coupling and torque multiplication of the pump portion 18 and turbine portion 26.

The transmission 14 is operable to provide nine forward speed ratios and four reverse speed ratios between the input member 28 and an output member 32. Each speed ratio corresponds with a respective "gear" in the first column of FIG. 2 and a corresponding torque ratio shown in the second column of FIG. 2, as is understood by those skilled in the art.

The transmission 14 includes a main shaft 34, a first countershaft 36, and a second countershaft 38. The input member 28 is connected for common rotation with main shaft 34. The first and second countershafts 36, 38 are arranged generally parallel with the main shaft 34. The transmission 14 includes a plurality of intermeshing gears as will be described herein. The main shaft 34 has a gear 40 connected for common rotation therewith that continuously intermeshes with gear 42. Gear 42 is concentric with and rotatable about the first countershaft 36. Gears 40 and 42 may be referred to as a first head gear set and form a first co-planar, intermeshing gear set. The co-planar nature of gears 40, 42 is indicated by plane P1A. Preferably, the co-planar, intermeshing gear sets described herein include: (i) at least a gear concentric with the main shaft 34 and either a gear concentric with one of the countershafts 36, 38 or (ii) a gear concentric with a reverse shaft, such as reverse shaft 164 described with respect to FIG. 3B below.

The main shaft 34 has a gear 44 connected for common rotation therewith. Gear 44 continuously intermeshes with gear 46 which is connected for common rotation with the second countershaft 38. Gears 44 and 46 are referred to herein as a second head gear set and form a second co-planar, intermeshing gear set, the co-planar nature of which is indicated by plane P2A.

Gear 48 is concentric with and rotatable about the first countershaft 36. Gear 48 continuously intermeshes with gear 50 which is connected for common rotation with the second countershaft 38. It should be understood that the main shaft 34 and the countershafts 36, 38 are in different planes, in a triangular formation so that gear 48 can continuously intermesh with gear 50 without interfering with main shaft 34. This is indicated in FIG. 1 by showing a portion of gear 48 in phantom to indicate that it is behind main shaft 34. Gears 48 and 50 form a third co-planar, intermeshing gear set, the co-planar nature of which is indicated by plane P3A.

A two-way dog clutch D is supported on the first countershaft 36. The dog clutch D is shiftable in two directions along first countershaft 36. The dog clutch D is shiftable to the left to connect gear 42 for common rotation with first countershaft 36. The dog clutch D is shiftable to the right to connect gear 48 for common rotation with first countershaft 36. When dog clutch D is shifted to the left, it partially establishes a forward speed ratio, as indicated in the column labeled DF in FIG. 2. When a dog clutch D is shifted to the right it partially establishes a first speed ratio as indicated in the column DR in FIG. 2. In a first forward speed ratio (Gear 1 indicated in the first column of FIG. 2), the dog clutch D may be shifted either to the left or to the right. When dog clutch D is shifted to the left, torque is transferred from the input member 28 along the first head gear set, gears 40 and 42 in P1A, to the first countershaft 36. Alternatively, when the dog clutch D is shifted to the right torque is transferred from the input member 28 through the second head gear set, gears 44 and 46 in P2A, to the second countershaft 38 and then through intermeshing gears 50 and 48 to the first countershaft 36.

The dog clutch D is preferably actuated by an independent actuator (not shown), such as in a hydraulic control system to move the two-way dog clutch D either to the right or to the left as discussed. The two-way dog clutch D is not actuated through the first countershaft 36, i.e., is not moved by moving the first countershaft 36.

Additional components of the transmission 14 include gears 52 and 54 which are concentric with and rotatable about the second countershaft 38. Gear 52 is supported on and rotates with sleeve shaft 53. Gear 54 is supported on and rotates with sleeve shaft 55. Gear 52 intermeshes with gear 56 which is concentric with and rotatable about the main shaft 34. Gear 54 intermeshes with gear 58 which is concentric with and rotatable about the main shaft 34. Gear 56 also intermeshes with gear 60 which is concentric with and rotatable about the first countershaft 36. Gear 60 is supported on and rotates with sleeve shaft 61. Gear 62 is supported on and rotatable with sleeve shaft 63. Gear 58 intermeshes with gear 62 which is rotatable about the first countershaft 36. Gears 52, 56 and 60 form a fourth co-planar, intermeshing gear set, the co-planar nature of which is indicated by plane P4A. Gears 54, 58 and 62 form a fifth co-planar, intermeshing gear set, the co-planar nature of which is indicated by plane P5A.

Transmission 14 further includes a planetary gear set 70. The planetary gear set 70 includes a sun gear member 72, a ring gear member 74 and a carrier member 76 that rotatably supports a plurality of pinion gears 77. The sun gear member 72 is continuously connected for common rotation with the gears 56 and 58 via sleeve shaft 80 and hub member 82. The carrier member 76 is continuously connected for common rotation with the output member 32.

The transmission 14 includes eight torque-transmitting mechanisms. The two-way dog clutch D is one of these eight torque-transmitting mechanisms. The other seven torque-transmitting mechanisms are referred to herein as C1, C2, C3, C4, C5, C6 and C7. C1 is a rotating clutch supported on the second countershaft 38 and is selectively engagable to connect gear 54 for common rotation with second countershaft 38. C2 is a rotating clutch supported on first countershaft 36 and is selectively engagable to connect gear 62 for common rotation with first countershaft 36. C3 is a rotating clutch supported on second countershaft 38 and is selectively engageable to connect gear 52 for common rotation with second countershaft 38. C4 is referred to herein as a bypass torque-transmitting mechanism or clutch that is selectively engagable to connect the main shaft 34 directly with the sun gear member 72, bypassing the first and second countershafts 36, 38. C5 is a rotating clutch supported on first countershaft 36 and is selectively engagable to connect gear 60 with the first countershaft 36 for common rotation. C6 is a brake that is selectively engagable to connect the ring gear member 74 with the transmission housing 24. C7 is referred to herein as a lock-up torque-transmitting mechanism or a rotating clutch that is selectively engageable to lock-up the planetary gear set 70 by connecting gears 56 and 58 for common rotation with both sun gear member 72 and ring gear member 74 via sleeve shaft 80 and hub member 82, thereby causing the entire planetary gear set 70 to rotate at the same speed as gears 56 and 58.

Referring to FIG. 2, the engagement schedule of the torque-transmitting mechanisms is indicated to achieve four reverse speed ratios and nine forward speed ratios. The transmission 14 could achieve 10 forward speed ratios if, after Gear 3, clutch C4 was engaged while clutch C3 is released and clutch C6 and two-way dog clutch D remained engaged in the forward position. This would provide a torque ratio with a numerical value between that indicated for Gear 3 and Gear 4 in FIG. 2. In the engagement schedule of FIG. 2 however, this alternate speed is skipped and C4 is not engaged during any of Gears 1 through 4. C7 is applied during Gears 5 through 9 to lock-up the planetary gear set 70 by connecting the gears 56 and 58 via sleeve shaft 80 and hub member 82 directly to both the ring gear member 74 and the sun gear member 72. As those skilled in the art will understand, when any two members of a planetary gear set are connected for common rotation, the entire planetary gear set rotates at the same speed. When C7 is applied to lock up the planetary gear set 70, the clutches C1, C2, C3, C4 and C5 may be selectively engaged in order, providing an additional five speed ratios, indicated as Gears 5 though 9 in FIG. 2. Thus, nine or ten forward speed ratios are achieved using only two rotating clutches on each of the countershafts 36 and 38. Each of the countershaft clutches are "reused" in achieving the ten forward speed ratios. This enables the countershafts 36 and 38 to be shorter in overall length. The two-way dog clutch D is packaged in what would otherwise likely be an unused space between the first and third planes P1A and P3A, thus not extending the required length of the first countershaft 36. The ratio change provided by the first and second headsets and that available through the planetary gear set 70 enable ten forward speed ratios to be achieved using only four countershaft clutches.

As is apparent in FIG. 1, the first countershaft 36 has gears in only four of the co-planar, intermeshing gear sets as indicated by planes: P1A, P3A, P4A and P5A. Likewise, the second countershaft 38 includes gears in only four of the co-planar, intermeshing gear sets as indicated by planes P2A, P3A, P4A and P5A. The transmission 14 includes only five total co-planar, intermeshing gear sets as indicated by planes P1A, P2A, P3A, P4A and P5A, plus the planetary gear set 70, thus maximizing compactness.

As indicated in FIG. 2, a relatively high total ratio coverage (TRC) of 8.658 is achieved by the transmission 14 between the input member 28 and the output member 32 (i.e., without including any torque ratio boosting affects of the torque converter 16). Additionally, small ratio steps are achieved, especially in the higher torque ratios, to maximize highway cruising fuel economy. A high torque ratio value is achieved in the first forward gear. Gear 1, thus providing adequate ratio coverage for take-off, especially in a commercial on-and-off highway line haul vehicle. The ratio steps are small enough to (i) enable lock-up of the torque converter 16 (by engaging lock-up clutch 30) during first gear (Gear 1) and (ii) lock-up to lock-up shifts, in higher gears, which significantly decreases transmission cooling demand.

The torque ratios and torque ratio steps indicated in FIG. 2 are achieved by utilizing the following gear tooth counts: gear 40 has 54 teeth; gear 42 has 44 teeth; gear 44 has 48 teeth; gear 46 has 53 teeth; gear 48 has 73 teeth; gear 50 has 72 teeth; gear 52 has 48 teeth; gear 54 has 34 teeth; gear 56 has 50 teeth; gear 58 has 66 teeth; gear 60 has 48 teeth; gear 62 has 34 teeth; ring gear 74 has 85 teeth; and sun gear 72 has 35 teeth. As will be apparent to those skilled in the art, other gear tooth counts resulting in other torque ratio, ratio step and total ratio coverage values may be used within the scope of the invention.

Referring to FIGS. 3A and 3B, another embodiment of a powertrain 110 having a transmission 114 within the scope of the invention is illustrated. The transmission 114 operates according to the engagement schedule of FIG. 2 to achieve the torque ratio and ratio steps between input member 128 and output member 132 as indicated in FIG. 4, except that Gear REV L and Gear REV H are achieved according to the engagement schedule for Gears REV 2 and REV 4, respectively, in FIG. 2, and dog clutch D100 need only be engaged in the forward direction (DF) in Gears 4 and 9. An optional tenth forward speed ratio may be achieved by engaging C4, releasing C3 and keeping C6 engaged after Gear 3.

The engine 12 is connected through torque converter 16 by engine shaft 20 to the transmission input member 128. The torque converter lock-up clutch 30 may be applied to directly connect the engine output shaft 20 with the input member 128, bypassing the ratio boosting effect of the torque converter 16. The torque converter 16 includes a pump portion 18, a stator portion 22 grounded to transmission housing 124 and a turbine portion 26. The torque converter 16 includes a pump portion 18, a stator portion 22 grounded to transmission housing 124 and a turbine portion 26. The torque converter 16 operates as described with respect to FIG. 1.

The transmission 114 includes a main shaft 134, a first countershaft 136, and a second countershaft 138. The input member 128 is connected for common rotation with main shaft 134. Gear 140 is connected for common rotation with main shaft 134 and continuously intermeshes with gear 142 which is connected for common rotation with first countershaft 136. Gears 140 and 142 may be referred to as a first head gear set which is a first, co-planar, intermeshing gear set, the co-planar nature of which is indicated by plane P1B.

Gear 144 is connected for common rotation with main shaft 134 and continuously meshes with gear 146 which is connected for common rotation with second countershaft 138. Gears 144 and 146 are referred to as a second head gear set, which is a second co-planar, intermeshing gear set as indicated by plane P2B. Gear 152 is concentric with and rotatable about second countershaft 138 and intermeshes with gear 156 which is concentric with and rotates about main shaft 134. Gear 152 is support on and rotates with sleeve shaft 153. Gear 156 intermeshes with gear 160 which is concentric with and rotates about first countershaft 136. Gear 156 is supported on and rotates with sleeve shaft 180. Gears 152, 156 and 160 form a third co-planar, intermeshing gear set, the co-planar nature of which is indicated by plane P3B.

FIG. 3B shows another portion of transmission 114. The transmission 114 includes a reverse shaft 164 that has gears 165 and 168 connected for common rotation therewith. The reverse shaft 164 is located so that gear 165 intermeshes with gear 156 and is aligned in the third plane P3B, and gear 168 intermeshes with gear 167, as indicated in FIG. 3B. Gear 165 is referred to as the first gear of the reverse shaft. Gear 167 is concentric with and rotates about first countershaft 136. Gears 168 and 167 form a fourth co-planar, intermeshing gear set, the co-planar nature of which is indicated by plane P4B. Reverse shaft 164 is offset from main shaft 134 and first countershaft 136 and is depicted in separate FIG. 3B for purposes of clarity.

Dog clutch D100 is a two-way dog clutch that is shiftable to the left in FIG. 3A to connect gear 167 for common rotation with first countershaft 136. When shifted to the left, dog clutch D100 partially establishes the REV L and REV H gears indicated in FIG. 4 according to the engagement schedule of FIG. 6 for REV L and REV H. Dog clutch D100 is shiftable to the left to connect gear 160 for common rotation with sleeve shaft 161.

Gear 154 is concentric with and rotatable about second countershaft 138 and continuously intermeshes with gear 158 which is concentric with and rotatable about main shaft 134. Gear 154 is supported on and rotates with sleeve shaft 155. Gear 158 continuously intermeshes with gear 162 which is concentric with and rotatable about first countershaft 136. Gears 156 and 158 are supported on and rotate with sleeve 180. Gear 162 is supported on and rotates with sleeve shaft 163. Gears 154, 158 and 162 form a fifth co-planar, intermeshing gear set, the co-planar nature of which is indicated by plane P5B.

The transmission 114 includes planetary gear set 170. Planetary gear set 170 includes a sun gear member 172, a ring gear member 174 and a carrier member 176 that rotatably supports a plurality of pinion gears 177 disposed in meshing relationship with both the sun gear member 172 and the ring gear member 174.

In addition to the dog clutch D100, the transmission 114 includes seven additional torque-transmitting mechanisms for a total of eight torque-transmitting mechanisms. Clutch C1 is selectively engageable to connect gear 154 for common rotation with second countershaft 138. Clutch C2 is selectively engageable to connect gear 152 for common rotation with second countershaft 138. Clutch C3 is selectively engageable to connect gear 162 for common rotation with first countershaft 136. Clutch C4 is a bypass clutch, selectively engagable to directly connect main shaft 134 with the sun gear member 172, bypassing the countershafts 136 and 138. Clutch C5 is selectively engageable to connect sleeve shaft 161 for common rotation with first countershaft 136. Clutch C6 is selectively engagable to ground the ring gear member 174 to the stationary transmission housing 124. Clutch C7 is selectively engageable to connect sun gear member 172 and ring gear member 174 for common rotation with gears 156 and 158 via sleeve shaft 180 and hub member 182, locking up planetary gear set 170 such that it as well as output member 132, rotates at the same speed as gears 156 and 158 and sleeve shaft 180.

The torque ratios and ratio steps of FIG. 4 are achieved by utilizing the following gear tooth counts on the gears of FIGS. 3A and 3B: gear 140 has 57 teeth; gear 142 has 55 teeth; gear 144 has 41 teeth; gear 146 has 59 teeth; gear 167 has 42 teeth; gear 168 has 47 teeth; gear 165 has 25 teeth; gear 152 has 48 teeth; gear 156 has 52 teeth; gear 160 has 59 teeth; gear 154 has 39 teeth; gear 158 has 59 teeth; gear 162 has 50 teeth; ring gear member 174 has 85 teeth and sun gear member 172 has 35 teeth. As will be apparent to those skilled in the art, other gear tooth counts resulting in other torque ratio, ratio step and total ratio coverage values may be used within the scope of the invention.

As is apparent in FIG. 3A, each countershaft 136 and 138 includes gears arranged in not more than four of the co-planar, intermeshing gear sets. The first countershaft 136 has gears in four of the co-planar, intermeshing gear sets, as indicated by planes P1B, P3B, P4B and P5B. The second countershaft 138 has gears in only three of the co-planar, intermeshing gear sets, as indicated by planes P2B, P3B and P5B. Thus, by utilizing the first head gear set of gears 140 and 142, the second head gear set of gears 144 and 146, and planetary gear set 170, the overall length required for the first and second countershafts 136, 138 is minimized.

Figure 5:
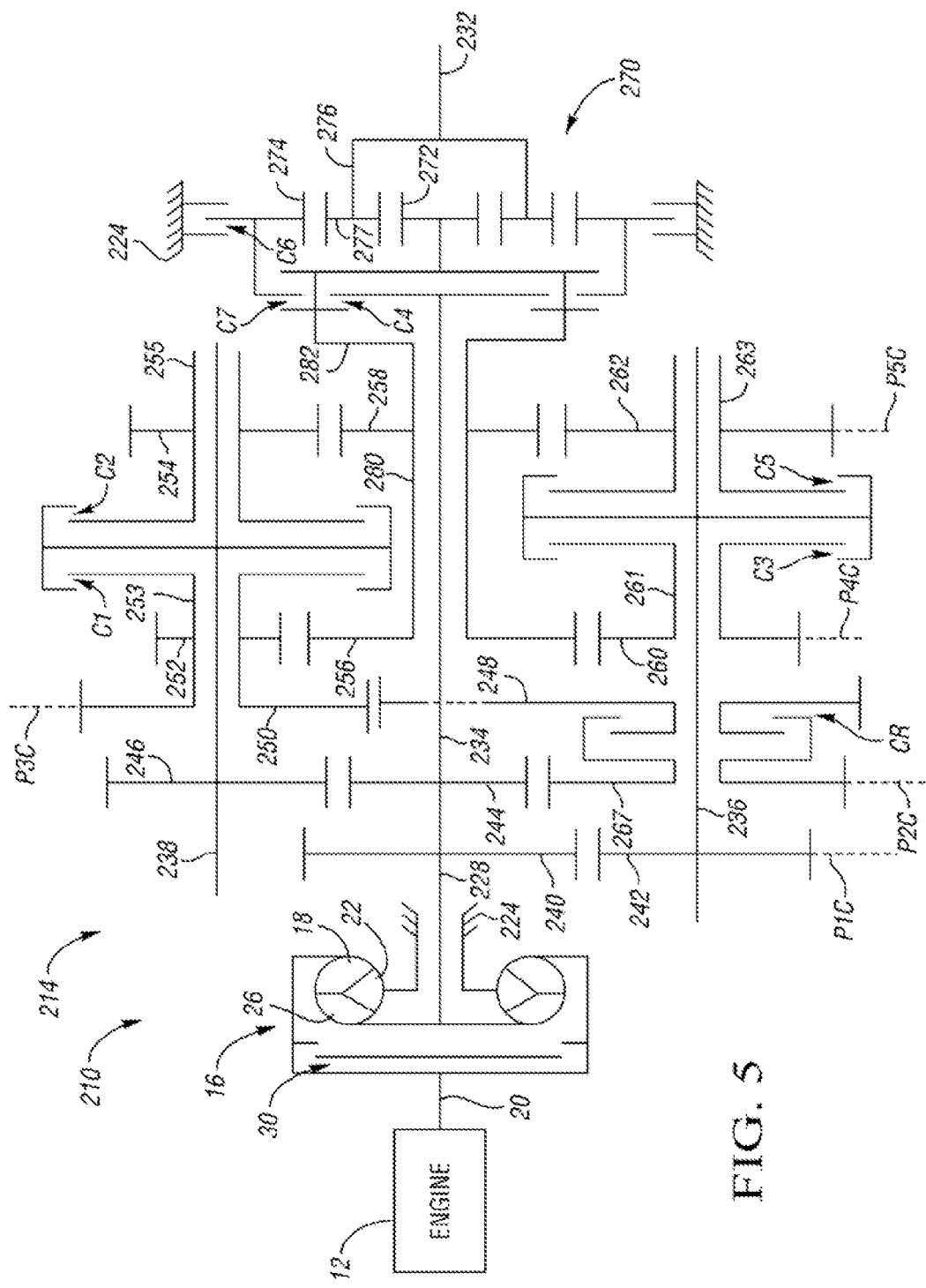
FIG. 5 is a schematic representation of a third embodiment of a transmission in accordance with the invention.

Referring to FIG. 5, another embodiment of a powertrain 210 with a transmission 214 within the scope of the invention is illustrated. The powertrain 210 includes an engine 12 with an engine shaft 20 connected through a torque converter 16 to an input member 228 of the transmission 214. The torque converter lock-up clutch 30 may be applied to directly connect the engine output shaft 20 with the input member 228, bypassing the ratio boosting effect of the torque converter 16. The torque converter 16 includes a pump portion 18, a stator portion 22 grounded to transmission housing 224 and a turbine portion 26. The torque converter 16 operates as described with respect to FIG. 1.

The transmission 214 is operable to provide nine forward speed ratios and two reverse speed ratios between input member 228 and transmission output member 232 as indicated by the torque ratios listed in the truth table of FIG. 6, and according to the engagement schedule of FIG. 6 as will be discussed herein.

The input member 228 is connected for common rotation with main shaft 234. The transmission 214 further includes first countershaft 236 and a second countershaft 238, both spaced from the main shaft 234 and substantially parallel therewith. The main shaft 234 has gear 240 connected for common rotation therewith. Gear 240 intermeshes with gear 242 which is connected for common rotation with first countershaft 236. Gear 240 and gear 242 form a first co-planar, intermeshing gear set, as indicated by plane P1C. Gears 240 and 242 may be referred to as a first head gear set.

Gear 244 is also connected for common rotation with main shaft 234. Gear 244 continuously intermeshes with gear 246 which is connected for common rotation with second countershaft 238. Gear 244 also intermeshes with gear 267 which is concentric with and rotatable about first countershaft 236. Gear 244, gear 246 and gear 267 form a second co-planar, intermeshing gear set, as indicated by plane P2C. Intermeshing gears 244, 246 and 267 may be referred to as a second head gear set.

Gear 248 is concentric with and rotatable about first countershaft 236. Gear 248 continuously intermeshes with gear 250 which is supported on sleeve shaft 253 to be concentric with and rotatable about second countershaft 238. The countershafts 236 and 238 and main shaft 234 are arranged in a triangular formation, allowing gears 248 and 252 to intermesh without interfering with the main shaft 234. This is indicated in FIG. 5 by gear 248 appearing partially in phantom behind main shaft 234.

A reverse torque-transmitting mechanism CR, which is a rotating clutch, is concentric with and supported for rotation about the first countershaft 236. Clutch CR is selectively engageable to connect gear 267 for common rotation with gear 248. When Clutch CR is engaged, torque may be transferred from the main shaft 234 through the second head gear set to gear 248. Gear 248 and gear 250 form a third co-planar, intermeshing gear set as indicated by plane P3C.

The transmission 214 further includes gear 252 and gear 254 both of which are concentric with and rotate about second countershaft 238. Gear 252 continuously intermeshes with gear 256 which is concentric with and supported on sleeve shaft 280 for common rotation about main shaft 234. Similarly, gear 254 is supported on and rotates with sleeve shaft 255 and continuously intermeshes with gear 258 which is concentric with and supported on sleeve shaft 280 for common rotation about main shaft 234. Gear 256 also continuously intermeshes with gear 260 which is concentric with and supported for common rotation about first countershaft 236 on sleeve shaft 261. Gear 258 also intermeshes with gear 262 which is concentric with and supported for common rotation about first countershaft 236 on sleeve shaft 263. Gear 252, gear 256 and gear 260 form a fourth co-planar, intermeshing gear set, the co-planar nature of which is indicated by plane P4C. Gear 254, gear 258 and gear 262 form a fifth co-planar, intermeshing gear set, as indicated by plane P5C.

The transmission 214 further includes a planetary gear set 270. The planetary gear set 270 includes a sun gear member 272, a ring gear member 274 and a carrier member 276 which rotatably supports a plurality of pinion gears 277. The pinion gears 277 intermesh with both the sun gear member 272 and the ring gear member 274. The carrier member 276 is continuously connected with the output member 232. The sun gear member 272 is connected for common rotation with both gear 256 and gear 258 via sleeve shaft 280 and hub member 282.

The transmission 214 includes eight torque-transmitting mechanisms engagable according to the engagement schedule in the truth table of FIG. 6 to establish nine forward speed ratios and two reverse speed ratios between the input member 228 and the output member 232. In addition to the torque-transmitting mechanism, clutch CR, seven additional torque-transmitting mechanisms, C1, C2, C3, C4, C5, C6 and C7 are included. An optional tenth forward speed ratio may be established by engaging C4, releasing C3 and keeping C6 engaged after Gear 3.

C1 is a rotating clutch selectively engageable to connect gear 252 for common rotation with the second countershaft 238. C2 is a rotating clutch selectively engageable to connect gear 254 for common rotation with the second countershaft 238. C3 is a rotating clutch selectively engageable to connect gear 260 for common rotation with first countershaft 236. C4 is a rotating clutch selectively engageable to connect main shaft 234 for common rotation with sun gear member 272, thus bypassing countershafts 236 and 238. C5 is selectively engageable to connect gear 262 for common rotation with first countershaft 236. Torque-transmitting mechanism C6 is a brake selectively engagable to ground the ring gear member 274 to the transmission housing 224. C7 is a rotating clutch selectively engagable to lock-up the planetary gear set 270 by connecting sleeve shaft 280, and thereby gears 256 and 258 to both the ring gear member 274 and the sun gear member 272, causing both the sun gear member 272 and the ring gear member 274, and therefore the entire planetary gear set 270 as well as output member 232, to rotate at the same speed.

Referring to FIG. 6, nine forward speed ratios and two reverse speed ratios are achieved according to the engagement schedule shown therein. The numerical torque ratio values are achieved with the following gear tooth counts: gear 240 has 57 teeth; gear 242 has 55 teeth; gear 246 has 59 teeth; gear 244 has 41 teeth; gear 267 has 70 teeth; gear 250 has 72 teeth; gear 248 has 75 teeth; gear 252 has 39 teeth; gear 256 has 59 teeth; gear 260 has 50 teeth; gear 254 has 48 teeth; gear 258 has 52 teeth; gear 262 has 59 teeth; the ring gear member 274 has 85 teeth and the sun gear member 272 has 35 teeth. As will be apparent to those skilled in the art, other gear tooth counts resulting in other torque ratio, ratio step and total ratio coverage values may be used within the scope of the invention.

Countershaft 236 supports gears arranged in only five co-planar, intermeshing gear sets arid countershaft 238 supports gears arranged in only four co-planar, intermeshing gear sets. For instance first countershaft 236 supports gears 242, 267, 248, 260 and 262 arranged in only five of the co-planar, intermeshing gear sets as indicated by planes P1C, P2C, P3C, P4C and P5C, respectively. The second countershaft 238 supports gears 246, 250, 252 and 254 arranged in only four of the co-planar, intermeshing gear sets, as indicated by planes P2C, P3C, P4C and P5C respectively. By utilizing the first and second head gear sets to provide a ratio change, a separate clutch is not required for each of the gears supported on the first and second countershafts 236 and 238 in order to provide nine forward speed ratios and two reverse speed ratios.

Figure 7:
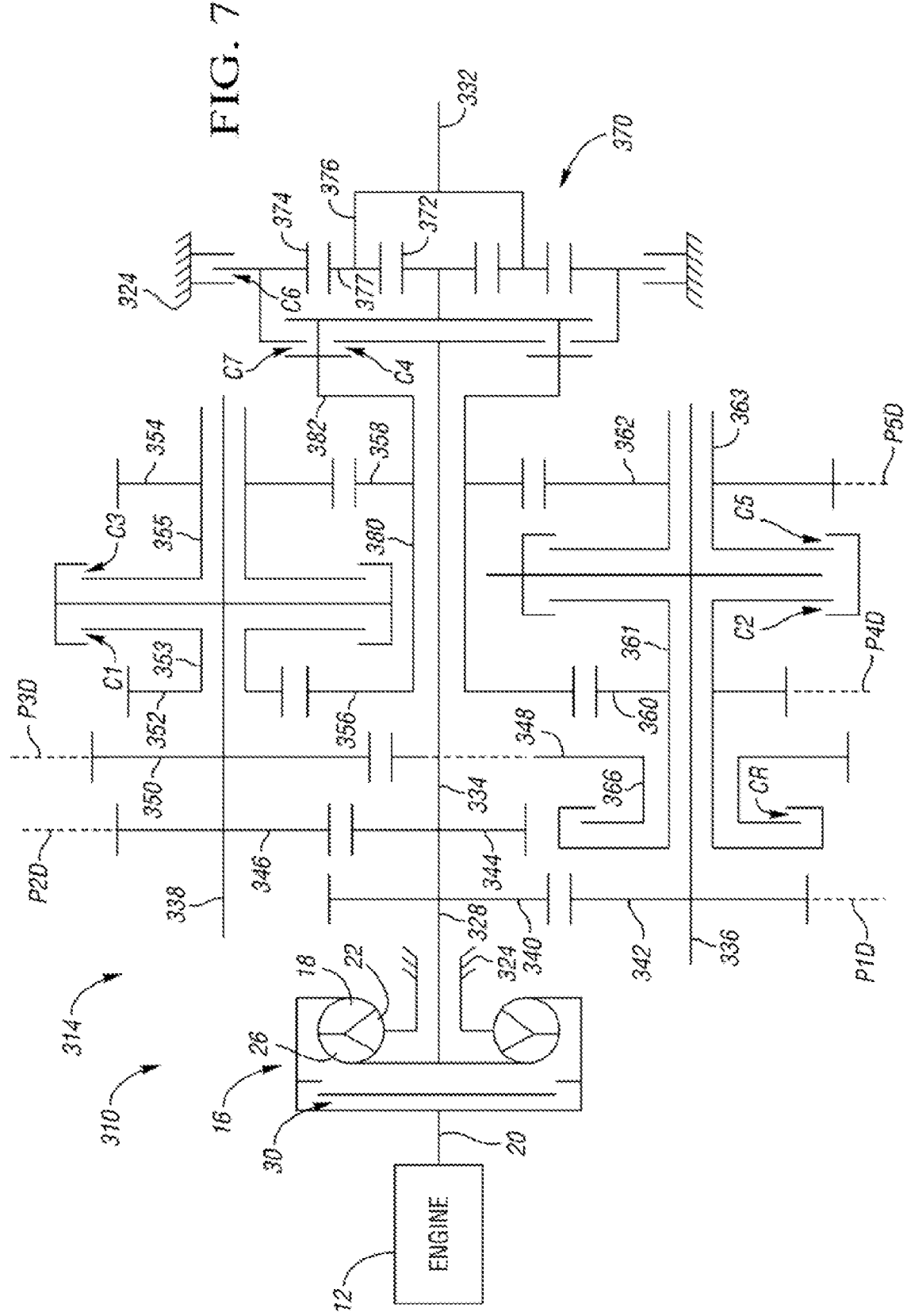
FIG. 7 is a schematic representation of a fourth embodiment of a transmission in accordance with the invention operated according to the engagement schedule of the truth table of FIG. 6, but with different torque ratios and ratio steps as determined by the gear tooth counts.

FIG. 7 illustrates another embodiment of a powertrain 310 having a transmission 314 within the scope of the invention. The powertrain 310 includes an engine 12 with an engine shaft 20 connected through a torque converter 16 to an input member 328 of the transmission 314. The torque converter lock-up clutch 30 may be applied to directly connect the engine output shaft 20 with the input member 28, bypassing the ratio boosting effect of the torque convert 16. The torque converter 16 includes a pump portion 18, a stator portion 22 grounded to transmission housing 324 and a turbine portion 26. The torque converter 16 operates as described with respect to FIG. 1.

The input member 328 is connected with a main shaft 334. The transmission 314 further includes a first countershaft 336 and a second countershaft 338. Both of the first and second countershafts 336, 338 are spaced from the main shaft 334 and are substantially parallel therewith. The transmission 314 is operable to provide nine forward speed ratios (an optional tenth forward speed ratio) and two reverse speed ratios between input member 328 and output member 332 according to the same engagement schedule as illustrated in the truth table of FIG. 6 and discussed herein, although the ratios achieved wilt be different due to different gear tooth counts that will be discussed herein.

Gear 340 is connected for common rotation with main shaft 334 and continuously intermeshes with gear 342 which is connected for common rotation with first countershaft 336. Gears 340 and 342 are referred to as a first head gear set and form a first co-planar, intermeshing gear set, the co-planar nature of which is indicated by plane P1D.

Gear 344 is connected for common rotation with main shaft 334 and continuously intermeshes with gear 346 which is connected for common rotation with the second countershaft 338. Gears 344 and 346 are referred to as a second head gear set and form a second co-planar, intermeshing gear set, the co-planar nature of which is indicated by plane P2D.

Gear 348 is supported by arid rotates with sleeve shaft 366 so that it is concentric with first countershaft 336 and rotates thereabout. Gear 348 intermeshes with gear 350 which is connected for common rotation with second countershaft 338. The countershafts 336 and 338 and main shaft 334 are arranged in a triangular formation, allowing gears 348 and 350 to intermesh without interfering with the main shaft 334, as indicated in FIG. 7 by showing gear 348 partially in phantom behind the main shaft 334. Gears 348 and 350 form a third co-planar, intermeshing gear set, the co-planar nature of which is indicated by plane P3D.

Gear 352 is supported on sleeve shaft 353 such that it is concentric with and rotates about second countershaft 338. Gear 354 is supported on sleeve shaft 355 such that it is concentric with rotates about second countershaft 338. Gear 352 continuously intermeshes with gear 356 which is supported on sleeve shaft 380 such that it is concentric with and rotates about main shaft 334. Gear 358 is also supported on sleeve shaft 380 and continuously intermeshes with gear 354.

Gear 360 is supported on sleeve shaft 361 such that it is concentric and rotates about first countershaft 336. Gear 360 continuously intermeshes with gear 356. Gear 352, gear 356 and gear 360 form a fourth co-planar, intermeshing gear set, the co-planar nature of which is indicated by plane P4D. Gear 362 is supported on sleeve shaft 363 such that it is concentric with and rotates about first countershaft 336. Gear 362 continuously intermeshes with gear 358. Gear 354, gear 358 and gear 362 form a fifth gear co-planar, intermeshing gear set, the co-planar nature of which is indicated by plane P5D.

The transmission 314 further includes a planetary gear set 370. The planetary gear set 370 includes a sun gear member 372, a ring gear member 374 and a carrier member 376. The carrier member 376 rotatably supports a plurality of pinion gears 377 that intermesh with both the sun gear member 372 and the ring gear member 374. The sun gear member 372 is continuously connected for common rotation with gears 356 and 358 via sleeve shaft 380 and hub member 382. The carrier member 376 is continuously connected with the output member 332.

The transmission 314 includes eight torque-transmitting mechanisms. One of these eight torque-transmitting mechanisms is a reverse torque-transmitting mechanism CR which is a rotating clutch supported on sleeve shaft 361 and selectively engagable to connect gear 348 for common rotation with sleeve shaft 361. When CR is engaged, torque can be transferred from the third set of co-planar, intermeshing gears aligned in plane P3D to the fourth set of co-planar, intermeshing gears aligned in plane P4D. The rotating clutch CR is packaged in what would otherwise be empty space between the first and fourth sets of co-planar, intermeshing gears (i.e., between planes P1D and P4D) on the first countershaft 336.

In addition to the reverse torque-transmitting mechanism CR, a rotating clutch C1 is selectively engagable to connect gear 352 and sleeve shaft 353 for common rotation with second countershaft 328. Rotating clutch C2 is selectively engageable to connect gear 360 and sleeve shaft 361 for common rotation with first countershaft 336. Rotating clutch C3 is selectively engagable to connect gear 354 and sleeve shaft 355 with second countershaft 338 for common rotation. Clutch C4 is a bypass clutch that is selectively engageable to connect main shaft 334 directly with the sun gear member 372, bypassing the first and second countershafts 336, 338. Clutch C5 is a rotating clutch selectively engageable to connect sleeve shaft 363 and gear 362 for common rotation with first countershaft 336. Torque-transmitting mechanism C6 is a brake selectively engageable to connect ring gear member 374 with the transmission housing 324. Rotating clutch C7 is referred to as a lock-up clutch as it is selectively engagable to connect both the ring gear member 374 and the sun gear member 372 for common rotation, thereby causing the entire planetary gear set 370 and output member 332 to rotate at the same speed as sleeve shaft 380 and gears 356 and 358.

As is apparent from the above discussion and from FIG. 7, the first countershaft 336 supports gears in only tour of the co-planar, intermeshing gear sets as indicated by planes P1D, P2D, P4D and P5D. The second countershaft 338 supports gears in four of the co-planar, intermeshing gear sets as indicated by planes P2D, P3D, P4D and P5D. By utilizing the first head gear set (gears 340 and 342) and the second head gear set (gears 344 and 346) to provide a ratio, and by utilizing the planetary gear set 370, the number of clutches and gears required to be located and supported by the countershafts 336 and 338 is minimized, thus allowing minimization of the overall length of the countershafts 336 and 338.

Referring to FIGS. 8A and 8B, another embodiment of the transmission 414 within the scope of the invention is illustrated. A powertrain 410 includes an engine 12 connected through an engine shaft 22 and torque converter 16 to an input member 428 of the transmission 414. The transmission 414 provides nine forward speed ratios (and an optional tenth forward speed ratio) and two reverse speed ratios between the input member 428 and the output member 432. According to the engagement schedule of FIG. 6 as discussed herein, but providing the torque ratios and ratio steps listed in the chart of FIG. 9. The torque converter lock-up clutch 30 may be applied to directly connect the engine output shaft 20 with the input member 428, bypassing the ratio boosting effect of the torque converter 16. The torque converter 16 includes a pump portion 18, a stator portion 22 grounded to transmission housing 424 and a turbine portion 26. The torque converter 16 operates as described with respect to FIG. 1.

The transmission 414 includes a main shaft 434, and first and second countershafts 436 and 438, respectively, spaced from the main shaft 434 and substantially parallel therewith. Gear 440 is supported for common rotation on main shaft 434 and intermeshes with gear 442 which is supported for common rotation with first countershaft 436. Gears 440 and 442 form a first co-planar, intermeshing gear set, the co-planar nature of which is indicated by plane P1E. Gears 440 and 442 are referred to herein as a first head gear set. Gear 444 is supported for common rotation with main shaft 434 and intermeshes with gear 446 which is supported for common rotation with second countershaft 438. Gear 444 and gear 446 form a second co-planar, intermeshing gear set the co-planar nature of which is indicated by plane P2E. Gears 444 and 446 are referred to herein as a second head gear set.

Gear 452 is supported by sleeve shaft 453 such that it is concentric with and rotates about second countershaft 438. Gear 454 is supported by sleeve shaft 455 such that it is concentric with and rotates about second countershaft 438. Gear 452 continuously intermeshes with gear 456 which is supported by sleeve shaft 480 such that it is concentric with and rotates about main shaft 434. Gear 454 continuously intermeshes with gear 458 which is also supported for rotation with sleeve shaft 480 such that it is concentric with and rotates about main shaft 434. Gear 456 continuously intermeshes with gear 460 which is supported for rotation with sleeve shaft 461 such that it is concentric with and rotates about first countershaft 436. Gear 458 continuously intermeshes with gear 462 which is supported for rotation with sleeve shaft 463 such that it is concentric with and rotates about first countershaft 436. Gears 452, 456 and 460 partially form a third co-planar, intermeshing gear set, the co-planar nature of which is indicated by plane P3E.

An additional gear 467 is supported on sleeve shaft 466 for rotation such that it is concentric with and rotates about first countershaft 436. Referring to FIG. 8B, a reverse cluster gear having a shaft 464 which may be referred to as a reverse shaft, is offset from main shaft 434 and countershafts 436 and 438. The reverse shaft 464 supports gear 468 for common rotation therewith as well as gear 465 for common rotation therewith. Reverse shaft 464 is positioned such that gear 468 continuously intermeshes with gear 467 and gear 465 continuously intermeshes with gear 456, as indicated in FIG. 8B. The transmission 414 includes eight torque-transmitting mechanisms. One of the eight torque-transmitting mechanisms is a reverse torque-transmitting mechanism CR which is selectively engagable to connect the sleeve shaft 466 and gear 467 for common rotation with the first countershaft 436. When CR is engaged, torque may be transferred from the first set of co-planar, intermeshing gears aligned in plane P2E, (that is gears 440 and 442) through gear 467 to the gears supported on reverse shaft 464, (that is gears 468 and 465) to gear 456 in the third set of co-planar, intermeshing gears aligned in plane P3E. In this manner, torque transferred from the first set of co-planar, intermeshing gears to the third set of co-planar, intermeshing gears. Gear 467 and gear 468 form a fourth co-planar, intermeshing gear set, the co-planar nature of which is indicated by plane P4E. Gear 465 partially forms the third co-planar, intermeshing gear set aligned in plane P3E. Gears 454, 458 and 462 form a fifth co-planar, intermeshing gear set, the co-planar nature of which is indicated by plane P5E.

The transmission 414 further includes a planetary gear set 470. The planetary gear set 470 includes a sun gear member 472, a ring gear member 474 and a carrier member 476 that rotatably supports a plurality of pinion gears 477 in meshing engagement with both the sun gear member 472 and the ring gear member 474. The sun gear member 482 is continuously connected for common rotation with gear 456 and gear 458 via sleeve shaft 480 and hub member 482. The carrier member 476 is continuously connected with the output member 432.

In addition to the reverse torque-transmitting mechanism CR, the transmission 414 includes seven additional torque-transmitting mechanisms. Rotating clutch C1 is supported on second countershaft 438 and is selectively engagable to connect gear 452 and sleeve shaft 453 with second countershaft 438 for common rotation. Additionally, rotating clutch C2 is supported on second countershaft 438 and is selectively engagable to connect gear 454 and sleeve shaft 455 for common rotation with the second countershaft 438. Rotating clutch C5 is supported on first countershaft 436 and is selectively engagable to connect gear 462 and sleeve shaft 463 for common rotation with first countershaft 436. Rotating clutch C3 is supported on first countershaft 436 and is selectively engageable to connect gear 460 and sleeve shaft 461 for common rotation with foe first countershaft 436. Rotating clutch C4 may be referred to as a bypass torque-transmitting mechanism and is selectively engagable to connect main shaft 434 directly with sun gear member 472, bypassing the first and second countershafts 436, 438. Torque-transmitting mechanism C6 is a brake which is selectively engagable to ground the ring gear member 474 to the transmission housing 424. Rotating clutch C7 is referred to herein as a lock-up clutch as it is selectively engagable to connect sun gear member 472 for common rotation with ring gear member 474 as well as sleeve shaft 480 and gears 456 and 454. Because the ring gear member 474 and sun gear member 472 rotate at the same speed, the entire planetary gear set 470 rotates at the same speed, and is said to be "locked-up". Therefore the output member 432 also rotates at the same speed as sleeve shaft 480.

It is apparent from FIGS. 8A and 8B and the above discussion that the first countershaft 436 supports gears in only four of the co-planar, intermeshing gear sets, as indicated by planes P1E, P3E, P4E and P5E. The second countershaft 438 supports gears in only three of the co-planar, intermeshing gear sets, as indicated by planes P2E, P3E and P5E. Because the first and second head gear sets, that is gears 440 and 442, and gears 444 and 446, respectively, are used to provide a ratio change, and the planetary gear set 470 may be utilized for further ratio coverage, the number of components required on the first and second countershafts 436, 438 is minimized, enabling minimization of the overall length of the countershafts 436 and 438.

The torque ratios and ratio steps illustrated in FIG. 9 are achieved utilizing the following gear tooth counts: gear 440 has 57 teeth; gear 442 has 55 teeth; gear 444 has 41 teeth; gear 446 has 59 teeth; gear 452 has 39 teeth; gear 454 has 48 teeth; gear 454 has 59 teeth; gear 458 has 52 teeth; gear 460 has 50 teeth; gear 462 has 59 teeth; gear 465 has 34 teeth; gear 467 has 35 teeth; gear 468 has 45 teeth; the ring gear member 474 has 85 teeth; and the sun gear member 472 has 35 teeth.

Referring to FIGS. 10A and 10B, another embodiment of a powertrain 510 of the transmission 514 within the scope of the invention is illustrated. The powertrain 510 includes an engine 12 connected an engine output shaft 20 through a torque converter 16 to an input member 528 of the transmission 514. The torque converter lock-up clutch 30 may be applied to directly connect the engine output shaft 20 with the input member 528, bypassing the ratio boosting effect of the torque converter 16. The torque converter 16 includes a pump portion 18, a stator portion 22 grounded to transmission housing 524 and a turbine portion 26. The torque converter 16 operates as described with respect to FIG. 1. The transmission 514 is operable to provide nine forward speed ratios (and an optional tenth forward speed ratio) and two reverse speed ratios according to the engagement schedule of FIG. 6 and as described herein, but provides different ratios due to the different gear tooth counts that will be provided herein. Those skilled in the art will readily understand how to calculate the speed and torque ratios achieved using the gear tooth counts provided herein.

The transmission 514 includes a main shaft 534 and first and second countershaft 536, 538 respectively, that are spaced from and are generally parallel with the main shaft 534. Gear 540 is supported for common rotation with main shaft 534 and continuously intermeshes with gear 542 which is supported for common rotation by first countershaft 536. Gears 540 and 542 partially form a first co-planar, intermeshing gear set, the co-planar nature of which is indicated by plane P1F. Gears 540 and 542 are referred to herein as a first head gear set. Gear 544 is support for common rotation on main shaft 534. Gear 544 continuously intermeshes with gear 546 which is supported for common rotation on second countershaft 538. Gears 544 and 546 are referred to herein as a second head gear set. Gears 544 and 546 form a second co-planar, intermeshing gear set, the co-planar nature of which is indicated by plane P2F. Gear 552 is supported on sleeve shaft 553 such that it is concentric with and rotates about second countershaft 538. Gear 552 continuously intermeshes with gear 556 which is supported on sleeve shaft 580 such that it is concentric with and rotates about main shaft 534. Gear 556 continuously intermeshes with gear 560 which is supported on sleeve shaft 561 such that it is concentric with and rotates about first countershaft 536. Gear 552, gear 556 and gear 560 partially form a third co-planar, intermeshing gear set, the co-planar nature of which is indicated by plane P3F.

Gear 554 is supported for rotation on sleeve shaft 555 such that it is concentric with and rotates about second countershaft 538. Gear 554 continuously intermeshes with gear 558 which is supported for rotation with sleeve shaft 580 such that it is concentric with and rotates about main shaft 534. Gear 558 continuously intermeshes with gear 562 which is supported on sleeve shaft 563 such that it is concentric with and rotates about first countershaft 536. Gear 554, gear 558 and gear 562 form a fourth co-planar, intermeshing gear set, the co-planar nature of which is indicated by plane P4F.

Referring to FIG. 10B, a reverse shaft 564 is positioned in a different plane than main shaft 534 and countershafts 536 and 538. The reverse shaft 564 has a gear 568 supported for common rotation thereon. Gear 565 is supported by sleeve shaft 566 such that it is concentric with and rotates about the reverse shaft 564. The reverse shaft 564 is positioned such that gear 568 continuously intermeshes with gear 540 and is part of the first co-planar, intermeshing gear set, the co-planar nature of which is indicated by plane P1F. Additionally, gear 567 continuously intermeshes with gear 565 and is positioned to intermesh with gear 556. Thus, both gears 565 and 567 partially form the third co-planar, intermeshing gear set, the co-planar nature of which is indicated by plane P3F.

The transmission 514 includes eight torque-transmitting mechanisms including a reverse torque-transmitting mechanism CR, winch is a rotating clutch supported on sleeve shaft 566 and selectively engagable to connect gear 565 and sleeve shaft 566 for common rotation with reverse shaft 564. Selective engagement of clutch CR enables a transfer of torque from gear 540 of the first set of co-planar, intermeshing gears in plane P1F to gear 556 of the third set of co-planar, intermeshing gears in plane P3F.

Referring again to FIG. 10A, the transmission 514 also includes a planetary gear set 570. The planetary gear set 570 includes a sun gear member 572, a ring gear member 574 and a carrier member 576 that rotatably supports a plurality of pinion gears 577 that intermesh with both the sun gear member 572 and the ring gear member 574. The sun gear member 572 is continuously connected for common rotation with gear 556 and gear 558 via sleeve shaft 580 and hub member 582. The carrier member 576 is continuously connected with the output member 532.

In additional to the reverse clutch CR, the transmission 514 includes a rotating clutch C1 supported by the second countershaft 538 and selectively engageable to connect gear 554 and sleeve shaft 555 for common rotation with second countershaft 538. The transmission 514 further includes rotating clutch C2 which is supported on the first countershaft 536 and is selectively engagable to connect gear 562 and sleeve shaft 563 for common rotation with first countershaft 536. Rotating clutch C3 is supported on second countershaft 538 and is selectively engagable to connect gear 552 arid sleeve shaft 553 for common rotation with second countershaft 538. Rotating clutch C4 is referred to herein as a bypass both clutch and is selectively engagable to main shaft 534 with sun gear member 572, thereby bypassing both first and second countershafts 536, 538, respectively. Rotating clutch C5 is supported on first countershaft 536 and is selectively engagable to connect gear 560 and sleeve shaft 561 for common rotation with first countershaft 536. Torque-transmitting mechanism C6 is a brake selectively engagable to ground the ring gear member 574 to the transmission housing 524. Rotating clutch C7 is referred to herein as a lock-up clutch as it is selectively engageable to connect both the ring gear member 574 and the sun gear member 572 for common rotation with gears 556 and 558 and sleeve shaft 580. Because the sun gear member 572 and ring gear member 574 rotate at the same speed, the entire planetary gear set 570 and the output member 532 rotate at the same speed as the sleeve shaft 580.

As is apparent from FIGS. 10A and 10B and the above discussion, the first countershaft 536 supports gears in only three of the co-planar, intermeshing gears sets indicated by planes P1F, P3F and P4F. The second countershaft 538 supports gears in only three of the co-planar, intermeshing gears sets indicated by planes P2F, P3F and P4F. Thus, by utilizing the first and second head gear sets, that is the first headset (gears 540 and 542) and the second headset (gears 544 and 546) to establish a ratio change, and by providing a planetary gear set 570 to provide ratio change, only two rotating clutches are necessary on each of the countershafts 536, 538 to provide nine forward speed ratios (and an optional tenth forward speed ratio) and two reverse speed ratios.

The transmission 514 is operated according to the engagement schedule of FIG. 6 but provides different torque ratios and steps according to the following tooth gear counts: gear 540 has 54 teeth; gear 542 has 44 teeth; gear 544 has 48 teeth; gear 546 has 53 teeth; gear 552 has 48 teeth; gear 556 has 50 teeth; gear 560 has 48 teeth; gear 554 has 34 teeth; gear 558 has 66 teeth; gear 562 has 34 teeth; gear 568 has 58 teeth; gear 565 has 34 teeth; gear 567 is an idler gear and can have any number of teeth without affecting the torque ratio; the ring gear member 574 has 85 teeth; and the sun gear member 572 has 35 teeth. As will be apparent to those skilled in the art other gear tooth counts resulting in other torque ratio, ratio step and total ratio coverage values may be used within the scope of the invention.

Figure 11A:
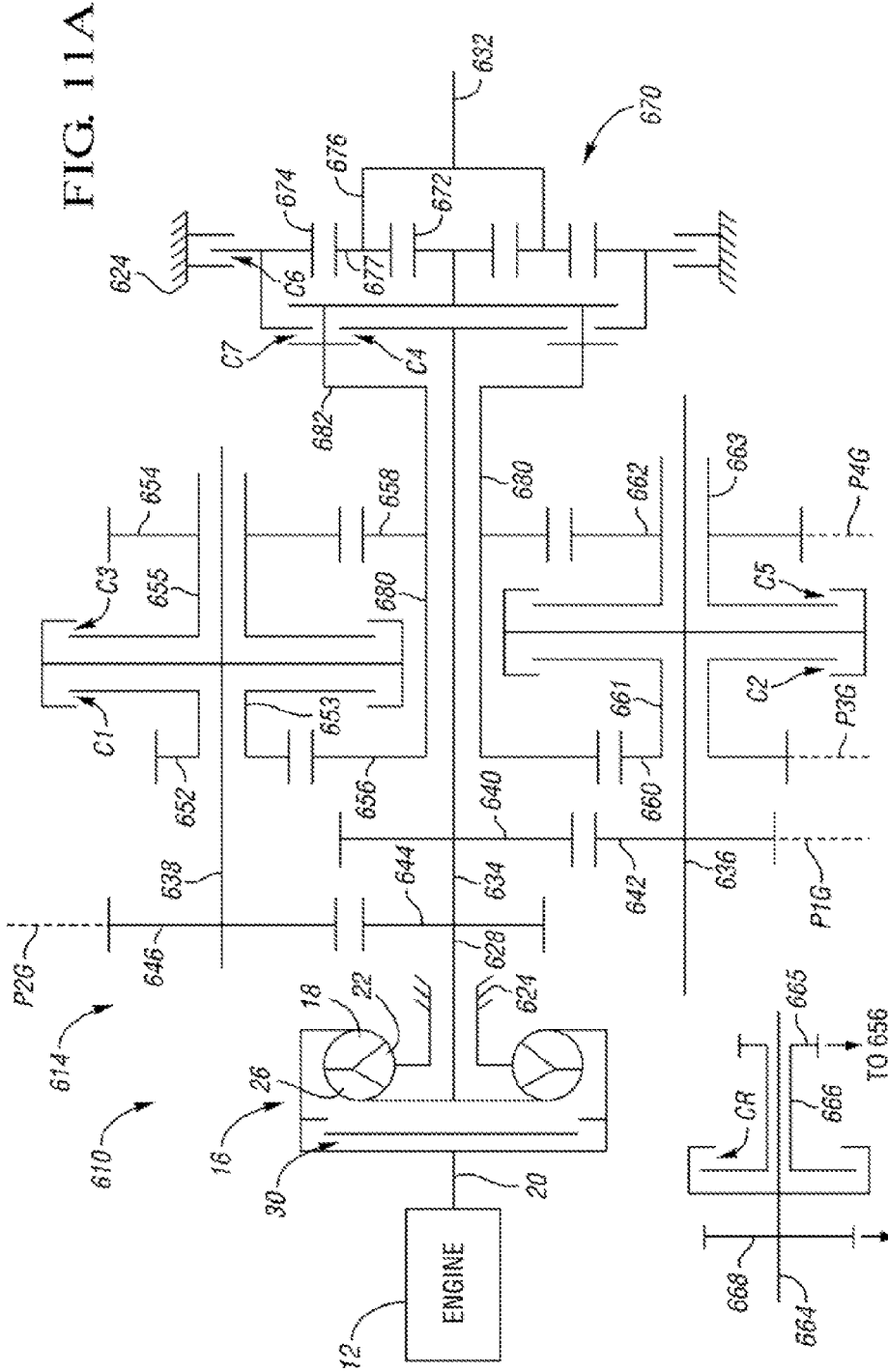
FIGS. 11A and 11B are schematic representations of a seventh embodiment of a transmission in accordance with the invention operated according to the engagement schedule of the truth table of FIG. 6, but with different torque ratios and ratio steps as determined by the gear tooth counts.
Figure 11B:
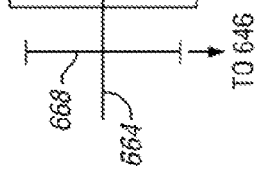

FIGS. 11A and 11B illustrate another embodiment of a transmission 614 within the scope of the invention. A powertrain 610 includes an engine 12 having an engine output shaft 20 connecting through a torque convert 16 to an input member 628 of the transmission 614. Transmission 614 is operable to provide at least nine forward speed ratios (and an optional tenth forward speed ratio) and two reverse speed ratios between the input member 628 and output member 632 according to the engagement schedule of the truth table of FIG. 6, but with different numerical values and different ratio steps according to tooth gear counts that will be described herein. The torque converter lock-up clutch 30 may be applied to directly connect the engine output shaft 20 with the input member 628, bypassing the ratio boosting effect of the torque converter 16. The torque converter 16 includes a pump portion 18, a stator portion 22 grounded to transmission housing 624 and a turbine portion 26. The torque converter 16 operates as described with respect to FIG. 1.

The transmission 614 includes a main shaft 634 and first and second countershaft 636, 638, respectively, spaced from and substantially parallel to the main shaft 634. Gear 644 is connected for common rotation with the main shaft 634 and continuously intermeshes with gear 646 which is connected for common rotation with second countershaft 638. Gear 644 and 646 partially form a second co-planar, intermeshing gear set, the co-planar nature of which is indicated by plane P2G. Gear 644 and 646 are referred to herein as a second head gear set.

Gear 640 is supported, for common rotation with the main shaft 634. Gear 640 continuously intermeshes with gear 642 which is supported for common rotation with first countershaft 636. Gear 640 and gear 642 are referred to herein as the first head gear set. Gear 640 and gear 642 form a first co-planar, intermeshing gear set, the co-planar nature of which is indicated by plane P1G.

Gear 652 is supported by sleeve shaft 653 such that it is concentric with and rotatable about second countershaft 638. Gear 652 continuously intermeshes with gear 656 which is supported by sleeve shaft 680 such that it is concentric with and rotates about main shaft 634. Gear 656 continuously intermeshes with gear 652. Gear 656 intermeshes with gear 660 which is supported by sleeve shaft 661 such that it is concentric with and rotates about first countershaft 636. Gear 652, gear 656 and gear 660 partially form a third co-planar, intermeshing gear set, the co-planar nature of which is indicated by plane P3G.

Gear 654 is supported by sleeve shaft 655 such that it is concentric with and rotates about second counter shaft 638. Gear 654 continuously intermeshes with gear 658 which is supported by sleeve shaft 680 such that it is concentric with and rotates about main shaft 634. Gear 658 continuously intermeshes with gear 662 which is supported by sleeve shaft 663 such that it is concentric with and rotates about first countershaft 636. Gear 654, gear 658 and gear 662 form a fourth co-planar, intermeshing gear set, the co-planar nature of which is indicated by plane P4G.

Referring to FIG. 11B, transmission 614 further includes a reverse shaft 664 which is offset from the main shaft 634 and countershafts 636 and 638. Gear 668 is supported for common rotation with reverse shaft 664. Reverse shaft 664 is positioned such that gear 668 continuously intermeshes with gear 646 and partially forms the second co-planar, intermeshing gear set. Gear 665 is supported on sleeve shaft 666 such that it is concentric with and rotatable about the reverse shaft 664. Gear 665 continuously intermeshes with gear 656 and partially forms the third co-planar, intermeshing gear set.

The transmission 614 includes eight torque-transmitting mechanisms including reverse torque-transmitting mechanism rotating clutch CR, which is selectively engagable to connect gear 665 and sleeve shaft 666 for common rotation with reverse shaft 664. Engagement of clutch CR enables a transfer of torque from gear 646 of the second co-planar, intermeshing gear set to gear 656 of the third co-planar, intermeshing gear set via the reverse shaft 664 and gears 668 and 665.

Referring to FIG. 11A, the transmission 614 includes a planetary gear set 670 that has a sun gear member 672, a ring gear member 674 and a carrier member 676 that rotatably supports a plurality of pinion gears 677 that continuously intermesh with the sun gear member 672 and the ring gear member 674. The carrier member 676 is continuously connected with the output member 632. The gears 656 and gear 658 are continuously connected for common rotation with the sun gear member 672 via the sleeve shaft 680 and hub member 682.

In addition to the reverse torque-transmitting mechanism clutch CR, transmission 614 includes rotating clutch C1 which is supported on second countershaft 638 and is selectively engagable to connect gear 652 and sleeve shaft 653 for common rotation with second countershaft 638. Rotating clutch C2 is supported on the first countershaft 636 and is selectively engagable to connect gear 660 and sleeve shaft 661 for common rotation with first countershaft 636. Rotating clutch C3 is supported on second countershaft 638 and is selectively engagable to connect gear 654 and sleeve shaft 655 for common rotation with second countershaft 638. Rotating clutch C4 is referred to herein as a bypass clutch and is selectively engagable to connect the main shaft 634 directly with the sun gear member 672, thereby bypassing the first and second countershafts 636, 638, respectively. Rotating clutch C5 is supported on first countershaft 636 and is selectively engageable to connect gear 662 and sleeve shaft 663 for common rotation with first countershaft 636. Torque-transmitting mechanism C6 is a brake that is selectively engagable to ground the ring gear member 674 to the transmission housing 624. Rotating clutch C7 is referred to herein as a lock-up clutch and is selectively engagable to connect the ring gear member 674 for common rotation with the sun gear member 672, thereby causing the entire planetary gear set 670 and the output member 632 to rotate at the same speed as gears 656, 658 and sleeve shaft 680.

As is apparent from FIGS. 11A and 11B and the above discussion, the first countershaft 636 supports gears in only three of the co-planar, intermeshing gear sets as indicated by planes P1G, P3G and P4G. The second countershaft 638 supports gears in only three of the co-planar, intermeshing gear sets as indicated by planes P2G, P3G and P4G. By utilizing the first head gear set (gears 640 and 642) and the second head gear set (gears 644 and 646) to provide ratio change, and by providing the planetary gear set 670 which provides a ratio change, only two rotating clutches are needed on each of the countershafts 636, 638, enabling minimization of the overall length of the countershafts 636, 638.

The transmission of 614 of FIGS. 11A and 11B is operated according to the engagement schedule of the truth table of FIG. 6, but provides different numerical values for the torque ratios, speed ratios and ratio steps according to the following gear tooth counts; gear 640 has 54 teeth; gear 642 has 44 teeth; gear 644 has 48 teeth; gear 646 has 53 teeth; gear 652 has 34 teeth; gear 654 has 48 teeth; gear 656 has 66 teeth; gear 658 has 50 teeth; gear 660 has 34 teeth; gear 662 has 48 teeth; gear 668 has 48 teeth; gear 665 has 35 teeth; the ring gear member 674 has 85 teeth; and the sun gear member 672 has 35 teeth. As will be apparent to those skilled in the art, other gear tooth counts resulting in other torque ratio, ratio step and total ratio coverage values may be used within the scope of the invention. Each of the transmission embodiments described herein is characterized by an absence of dual input clutches and of dual output clutches. As those skilled in the art will readily understand, "dual input clutches" are alternatively selectively engagable clutches which transfer torque alternatively to the two countershafts in a conventional countershaft transmission. Similarly, "dual output clutches" are alternatively selectively engageable clutches supported on the two countershafts of a conventional countershaft transmission which are alternately engageable to transfer torque from the respective countershafts to foe output member.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   an output member;
   a main shaft operatively connected with said input member;
   a first and a second countershaft, each spaced from and substantially parallel with said main shaft;
   a plurality of gears for transferring torque between said main shaft, first countershaft and second countershaft and forming different co-planar, intermeshing gear sets; wherein each of said countershafts has different ones of said intermeshing gears concentric therewith and partially forming not more than four of said co-planar, intermeshing gear sets; wherein said co-planar, intermeshing gear sets include:
      a first head gear set forming a first of said co-planar, intermeshing gear sets for transferring torque from said main shaft to said first countershaft; and
      a second head gear set forming a second of said co-planar, intermeshing gear sets for transferring torque from said main shaft to said second countershaft;
   a planetary gear set operatively connected between said input member and said output member; wherein all of said co-planar, intermeshing gear sets are spaced axially between said input member and said planetary gear set; and
   eight torque-transmitting mechanisms selectively engagable to at least partially establish at least nine forward speed ratios and at least one reverse speed ratio between said input member and said output member.

2. The transmission of claim 1, wherein said transmission is characterized by an absence of dual input clutches and an absence of dual output clutches.

3. The transmission of claim 1, wherein said eight torque-transmitting mechanisms include four torque-transmitting mechanisms each of which is a rotating clutch connected to and concentric with one of said countershafts and selectively engagable to connect a different one of said gears concentric with said one of said countershafts for rotation with said one of said countershafts.

4. The transmission of claim 1, wherein said eight torque-transmitting mechanisms include a bypass torque-transmitting mechanism selectively engagable to transfer torque directly from said input member to said planetary gear set, thereby bypassing said countershafts.

5. The transmission of claim 1, wherein said planetary gear set includes a ring gear member, a carrier member and a sun gear member; and wherein said eight additional torque-transmitting mechanisms include a brake selectively engagable to ground said ring gear member to a stationary member.

6. The transmission of claim 1, wherein said planetary gear set includes a ring gear member, a carrier member and a sun gear member; and wherein said eight torque-transmitting mechanisms include a lock-up torque-transmitting mechanism selectively engagable to connect any two of said members of said planetary gear set for common rotation.

7. The transmission of claim 1, wherein said plurality of gears includes a first gear concentric with said first countershaft and a second gear concentric with said second countershaft for transferring toque between said countershafts; wherein said first and second gears at least partially form a third of said co-planar, intermeshing gear sets; wherein said first and second head gear sets are spaced axially between said input member and said third of said co-planar, intermeshing gear sets; and
   wherein, one of said eight torque-transmitting mechanisms is a reverse torque-transmitting mechanism selectively engagable to at least partially establish said reverse speed ratio by transferring torque from one of said head gear sets to at least one of said gears at least partially forming said third of said co-planar, intermeshing gear sets.

8. The transmission of claim 7, wherein said first gear concentric with said first countershaft and said second gear concentric with said second countershaft continuously intermesh with one another.

9. The transmission of claim 7, further comprising:
   a reverse shaft; wherein said reverse torque-transmitting mechanism is a rotating clutch concentric with said reverse shaft; and
   gears concentric with said reverse shaft and partially forming said first and said third of said co-planar, intermeshing gear sets.

10. The transmission of claim 7, wherein said reverse torque-transmitting mechanism is a two-way dog clutch concentric with and supported by said first countershaft, shiftable in one direction to partially establish said reverse speed ratio and shiftable in an opposite direction to at least partially establish said nine forward speed ratios.

11. The transmission of claim 10, further comprising:
    a reverse shaft;
    a first gear connected for common rotation with said reverse shall and partially forming said third of said co-planar, intermeshing gear sets;
    a second gear connected for common rotation with said reverse shaft;
    another gear concentric with said first countershaft intermeshing with said second gear connected for common rotation with said reverse shaft; and wherein torque is transferable via said reverse shaft by engagement of said reverse torque-transmitting mechanism.

12. The transmission of claim 7, wherein said reverse torque-transmitting mechanism is a rotating clutch concentric with said first countershaft.

13. The transmission of claim 12, further comprising:
a reverse shaft;
a first gear connected for common rotation with said reverse shaft and partially forming said third of said co-planar, intermeshing gear sets;
a second gear connected for common rotation with said reverse shaft;
another gear concentric with said first countershaft and intermeshing with said second gear connected for common rotation with said reverse shaft; and wherein torque is transferable via said reverse shaft via engagement of said reverse torque-transmitting mechanism.

14. A transmission comprising:
an input member;
an output member;
a main shaft operatively connected to said input member;
a first and a second countershaft, each spaced from and substantially parallel with said main shaft;
a plurality of gears arranged in only five co-planar, intermeshing gear sets, each of said gears concentric about one of said main, shaft, said first countershaft and said second countershaft;
a planetary gear set operatively connected to at least some of said gears and directly connected to said output member; and
eight torque-transmitting mechanisms selectively engagable to establish at least nine forward speed ratios between said input member and said output member.

15. The transmission of claim 14, wherein one of said torque-transmitting mechanisms is a dog clutch shiftable to connect one of said gears for common rotation with said first countershaft to partly establish said reverse speed ratio.

16. The transmission of claim 14, wherein said transmission is characterized by an absence of a separate reverse shaft and an absence of an idler gear.

17. A transmission comprising:
an input member;
an output member;
a main shaft operatively connected to said input member;
a first and a second countershaft, each spaced from and substantially parallel with said main shaft;
a plurality of gears forming different co-planar, intermeshing gear sets, each of said gears concentric about one of said main shaft, said first countershaft and said second countershaft, wherein said gears concentric with said first countershaft partially form not more than four of said co-planar, intermeshing gear sets; wherein said gears concentric with said second countershaft partially form not more than four of said co-planar, intermeshing gear sets;
a planetary gear set operatively connected to at least some of said gears and directly connected to said output member; and
eight torque-transmitting mechanisms selectively engagable to establish at least nine forward speed ratios between said input member and said output member.

18. The transmission of claim 17, wherein said eight torque-transmitting mechanisms include four rotating clutches, wherein said gears concentric with said first countershaft include two gears selectively connectable for common rotation with said first countershaft by two of said four rotating clutches; and wherein said gears concentric with said second countershaft include two gears selectively connectable for common rotation with said second countershaft by another two of said four rotating clutches.

19. The transmission of claim 18, wherein one of said eight torque-transmitting mechanisms is a dog clutch concentric with said first countershaft and shiftable in one direction to at least partially establish a reverse speed ratio and in another direction to at least partially establish said at least nine forward speed ratios; and wherein said countershafts are characterized by an absence of any additional torque-transmitting mechanisms.

* * * * *